US012307465B2

(12) United States Patent
Dwivedi et al.

(10) Patent No.: US 12,307,465 B2
(45) Date of Patent: *May 20, 2025

(54) SYSTEMS AND METHODS FOR A DATA CONNECTOR INTEGRATION FRAMEWORK

(71) Applicant: PayPal, Inc., San Jose, CA (US)

(72) Inventors: Vinay Dwivedi, Hyderabad (IN); Magandeep Singh, Chandigarh (IN)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,459

(22) Filed: Feb. 24, 2024

(65) Prior Publication Data
US 2024/0320679 A1 Sep. 26, 2024

Related U.S. Application Data

(63) Continuation of application No. 17/345,746, filed on Jun. 11, 2021, now Pat. No. 11,941,634.

(30) Foreign Application Priority Data

Jun. 30, 2020 (IN) .............................. 202041027744

(51) Int. Cl.
| G06Q 20/40 | (2012.01) |
| G06F 9/445 | (2018.01) |
| G06F 9/455 | (2018.01) |
| G06F 21/62 | (2013.01) |
| G06N 3/04 | (2023.01) |

(52) U.S. Cl.
CPC ...... *G06Q 20/4016* (2013.01); *G06F 9/44505* (2013.01); *G06F 9/45558* (2013.01); *G06F 21/6227* (2013.01); *G06N 3/04* (2013.01); *G06F 2009/45579* (2013.01); *G06F 2009/45595* (2013.01)

(58) Field of Classification Search
CPC ............ G06Q 20/4016; G06F 9/44505; G06F 9/45558; G06F 21/6227; G06F 2009/45579; G06F 2009/45595; G06N 3/04

See application file for complete search history.

(56) References Cited

U.S. PATENT DOCUMENTS

| 11,392,847 | B1 * | 7/2022 | Abdollahian | G06N 20/00 |
| 2014/0317600 | A1 * | 10/2014 | Klunder | G06F 11/3672 |
| | | | | 717/124 |
| 2018/0189871 | A1 * | 7/2018 | Lennert | G06Q 40/03 |
| 2021/0374127 | A1 * | 12/2021 | Mavrommatis | G06F 9/541 |

* cited by examiner

*Primary Examiner* — Chris Parry
*Assistant Examiner* — Hassan A Khan
(74) *Attorney, Agent, or Firm* — Haynes and Boone, LLP (57) ABSTRACT

There are provided systems and methods for a data integration framework that provides an institutional or organizational user data enrichment capability locally. Specifically, instead of relying on the fraud detection platform to constantly updating and/or building new data connectors to intake data from updated or a new data provider, an institutional user, such as a financial institution, may receive a software development kit (SDK) from the fraud detection platform, using which the institutional user may build its own data connector deployed at the institutional user.

20 Claims, 9 Drawing Sheets

```
{
    "id": "Y235GJ24B53D_1472829936422",
    "entity": "loan_application",
    "fields": {
        "account_number": "xxxxxxx",
        "user_id": "4f4f142323",
        "session_id": "34oifj34ofij4kjmltgkertlg;kjsdrtg",
        "client_type": "web",
        "trx_time": 1501539163000,
        "user_email": "john.doe@simility.com",
        "amount_usd":1500.00,
        "device_ip_address":"145.67.89.21",
        "city":"San Francisco",
        "state_code":"CA",
        "country_code":"USA"
    }
}
```

Figure 3

```
{
    "accuracy_radius": 100,
    "autonomous_system_number": null,
    "autonomous_system_organization": null,
    "city_name": null,
    "connection_type": "CABLE_DSL",
    "continent_name": "Europe",
    "country_iso_code": "NL",
    "country_name": "Netherlands",
    "domain": null,
    "geo_error": null,
    "is_anonymous_proxy": false,
    "is_satellite_provider": false,
    "isp": "SURFnet",
    "latitude": 52.3824,
    "longitude": 4.8995,
    "organization": "SURFnet",
    "postal_code": null,
    "registered_country_iso_code": "NL",
    "registered_country_name": "Netherlands",
    "represented_country_code": null,
    "represented_country_name": null,
    "represented_country_type": null,
    "source": "MAXMIND",
    "subdivisions_name": null,
    "time_zone": "Europe/Amsterdam",
    "user_type": null
}
```

Figure 4

```
"email_address_checks": {
    "diagnostics": [],
    "email_domain_creation_date": "2010-08-21",
    "email_domain_creation_days": 3540,
    "email_first_seen_date": "2020-03-24",
    "email_first_seen_days": 37,
    "email_to_name": "No name found",
    "error": null,
    "is_autogenerated": false,
    "is_disposable": false,
    "is_valid": true,
    "registered_name": null,
    "registered_owner_age_range": null,
    "warnings": []
},
"identity_check_score": 433,
"ip_address_checks": {
    "connection_type": "Cable/DSL",
    "distance_from_address": 283,
    "distance_from_phone": null,
    "error": null,
    "geolocation": {
        "city_name": "San Francisco",
        "continent_code": "NA",
        "country_code": "USA",
        "country_name": "United States",
        "postal_code": "37167",
        "subdivision": ""
```

──── 502

```
    "is_proxy": false,
    "is_valid": true,
    "warnings": []
},
"primary_address_checks": {
    "address_to_name": "Match",
    "diagnostics": [],
    "error": null,
    "is_active": true,
    "is_commercial": false,
    "is_forwarder": false,
    "is_resident_deceased": false,
    "is_valid": true,
    "resident_age_range": "",
    "resident_name": "",
    "type": "Single unit",
    "warnings": []
},
"primary_phone_checks": {
    "carrier": null,
    "country_code": null,
    "error": null,
    "is_commercial": null,
    "is_connected": null,
    "is_prepaid": null,
    "is_subscriber_deceased": null,
    "is_valid": false,
    "line_type": null,
    "phone_to_address": null,
    "phone_to_name": null,
    "subscriber_age_range": null,
    "subscriber_name": null,
    "warnings": [
        "Invalid Input"
    ]
}
```

SYSTEMS AND METHODS FOR A DATA CONNECTOR INTEGRATION FRAMEWORK

CROSS-REFERENCE(S)

The present application is a continuation of U.S. patent application Ser. No. 17/345,746, filed Jun. 11, 2021, which claims priority to Indian Provisional Application No. 202041027744, filed on Jun. 30, 2020 (WIPO Digital Access Service (DAS) code 9E8F), which are hereby expressly incorporated by reference herein in their entirety.

TECHNICAL FIELD

The present application generally relates to data integration for fraud detection and more specifically to a data connector integration framework that builds a data connector at a client device for intaking data at a fraud detection server.

BACKGROUND

Enterprises and financial institutions may engage with a fraud detection platform to process data received from various events such as account creation, financial transactions, user log into accounts, and/or the like. The fraud detection platform sometimes employs a machine learning engine to analyze the received data, e.g., to detect whether a financial transaction request may be fraudulent. The machine learning engine may intake a large amount of data at its data processing pipeline, and the data may be received from various data providers, such as but not limited to EQUIFAX®, LEXISNEXUS®, SOCURE®, WHITEPAGES®, and so on. Data enrichment by the various types of data from various data providers increases the dimensionality of the input data feeds to the fraud detection system and the amount of information that may be used to catch a fraudulent activity.

In order to properly use specific data provided by a data provider, the fraud detection platform sometimes builds a data connector to integrate the various different types of data such that the received data may be used for fraud detection at the machine learning engine. However, different financial institutions may want to include more and more types of data for fraud detections, e.g., credit bureau data from a foreign credit agency, etc. In addition, many data providers may change and update the data formats and versions of the data they publish frequently. Thus, in order to intake data from the various data providers properly, the fraud detection may always need to update their data integration channel, and/or build new data integration channels with the new data providers as and when situations demand. The continuous new development of new data integration may consume excessive engineering resources and time for the fraud detection platform.

BRIEF DESCRIPTION OF THE DRAWINGS

FIGS. 3-5 provides example data artifacts provided by different data providers, according to one embodiment;

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a data connector integration framework that builds a data connector at a client device for intaking data at a fraud detection server. Systems suitable for practicing methods of the present disclosure are also provided.

A fraud detection platform, such as the fraud detection service provided by PAYPAL®, Inc. of San Jose, CA, USA, may adopt a machine learning engine for fraud detection. Such machine learning engine may take as input various different types of data from different data providers. For example, the type of data requested by a financial institution to perform fraud detection may depend on the country and/or region where the financial institution belongs—for instance, a credit bureau data provider that may provide a credit score associated with an SSN in the United State may not be useful for a financial institution located in Brazil or Indonesia to clear a transaction, as the SSN may not be readily associated with any user who is involved in the transaction in Brazil or Indonesia. As another example, a central provider fund (CPF) status provider from Brazil may not provide data that is useful for fraud detection with regard to transactions in Europe. For another example, user data from less developed countries or regions, such as scanned documents for credit card applications, which may be stored as scanned image files, may not be compliant with a usable data format that the fraud detection platform can readily use. For another example, many of the data providers may update or change the version, data format, and/or reporting format of their data output frequently. Thus, if the fraud detection platform constantly needs to build new data connectors to integrate data from various data providers worldwide, the engineering resource and time required can be inefficient for the fraud detection platform. The constant needs to change or even re-build data connectors at the fraud detection platform also hinders live deployment.

In view of the need to provide more efficient data integration from various data providers and thus achieve live deployment of fraud detection, embodiments described herein provide a data integration framework that provides an institutional or organizational user data enrichment capability at a local level. Specifically, instead of relying on the fraud detection platform to constantly updating and/or building new data connectors to intake data from updated or a new data provider, an institutional user, such as a financial institution, may receive a software development kit (SDK) from the fraud detection platform, using which the institutional user may build its own data connector deployed at the server of the institutional user.

For example, the development team from the fraud detection platform may share a Java Archive (JAR) file that aggregate Java class files and associated metadata and resources (text, images, etc.) and a configuration file for building a data connector with an institutional user. The institutional user may in turn obtain the JAR file and the configuration file, e.g., by copying the JAR file and the configuration file to a virtual machine that the institutional user is operating upon, at which a data connector may be built using the JAR and configuration file. In this way, the institutional user may use its own newly built data connector to intake and integrate data from a desired data provider. The data connector built by the institutional user may then serve as a plugin to the data pipeline of the fraud detection platform to supply integrated data, e.g., data from the data provider but has been converted to a format ready to use by the fraud detection platform.

Therefore, by providing each institutional user the data integration and enrichment capabilities, the fraud detection platform may allocate engineering resource elsewhere other than a centralized data integration at the fraud detection. In addition, as each institutional user is provided with the capability of building its own data connector for a desired data provider on demand, the respective institutional user does not need to wait for the fraud detection platform to intake and integrate data from the desired data provider, but rather can control data intake itself. The scalability for live deployment of the fraud detection platform can be largely improved.

Figure 1:
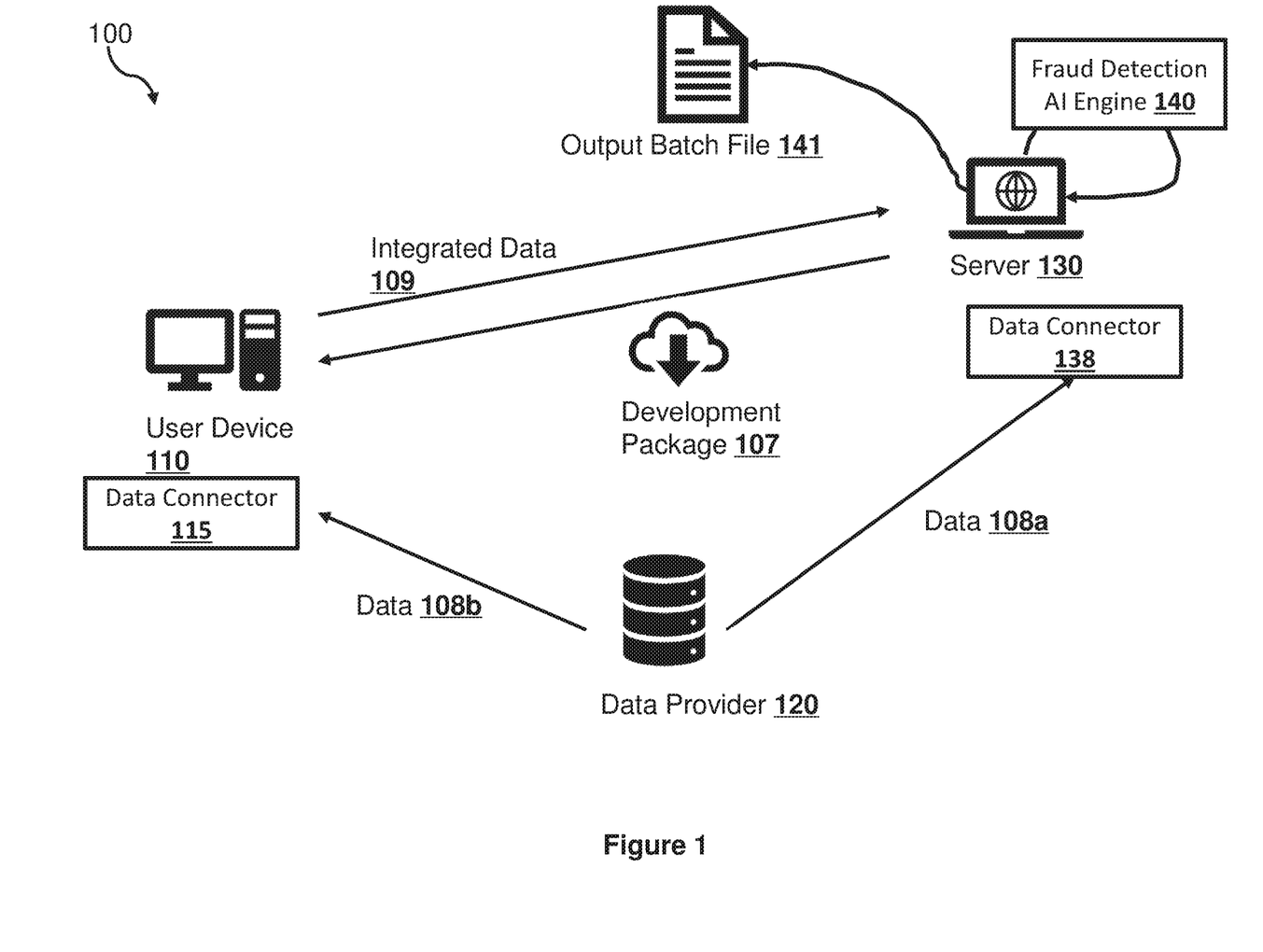
FIG. 1 is a block diagram illustrating example data flows between multiple entities for a data integration framework, according to one embodiment described herein.

FIG. 1 is a block diagram 100 illustrating example data flows between multiple entities for a data integration framework, according to one embodiment described herein. Diagram 100 shows a client device 110, a data provider 120, a server 130 and the interactions therebetween.

The client device 110 may be a device, a workstation, a server, and/or the like operated by, or deployed with an institutional user, such as a bank, a merchant, a manufacturer, a distributor, and/or the like, who demands fraud detection service. The data provider 120 may be an entity that provides various data that may be provide information relating to financial account holders, financial transaction, and/or the like. For example, the data provider 120 may be a credit rating bureau, a business analytics company, a census database, and/or the like. It is noted that although only one data provider 120 is shown in FIG. 1, various data providers may provide data to the client device 110 or the server 130. The server 130 may be associated with a fraud detection platform or a financial processing system, e.g., PAYPAL®, Inc. of San Jose, CA, USA. Further implementations of the client device 110, data provider 120 and the server 130 may be discussed in relation to FIG. 2.

As shown at diagram 100, the server 130 may normally maintain a data connector 138 configured to intake various data 108a from data provider(s) 120. For example, data 108a published by the data provider 120 usually have various different versions, different formats, unstandardized data variable names, data fields, acronyms, and/or the like, and thus may not be readily usable by the fraud detection artificial intelligence (AI) engine 140 at the server 130. A data connector 138 is configured to translate and/or conform the various data variables and values into a compliant format such that the fraud detection AI engine may be able to employ them into the AI fraud detection algorithm.

Figure 3:
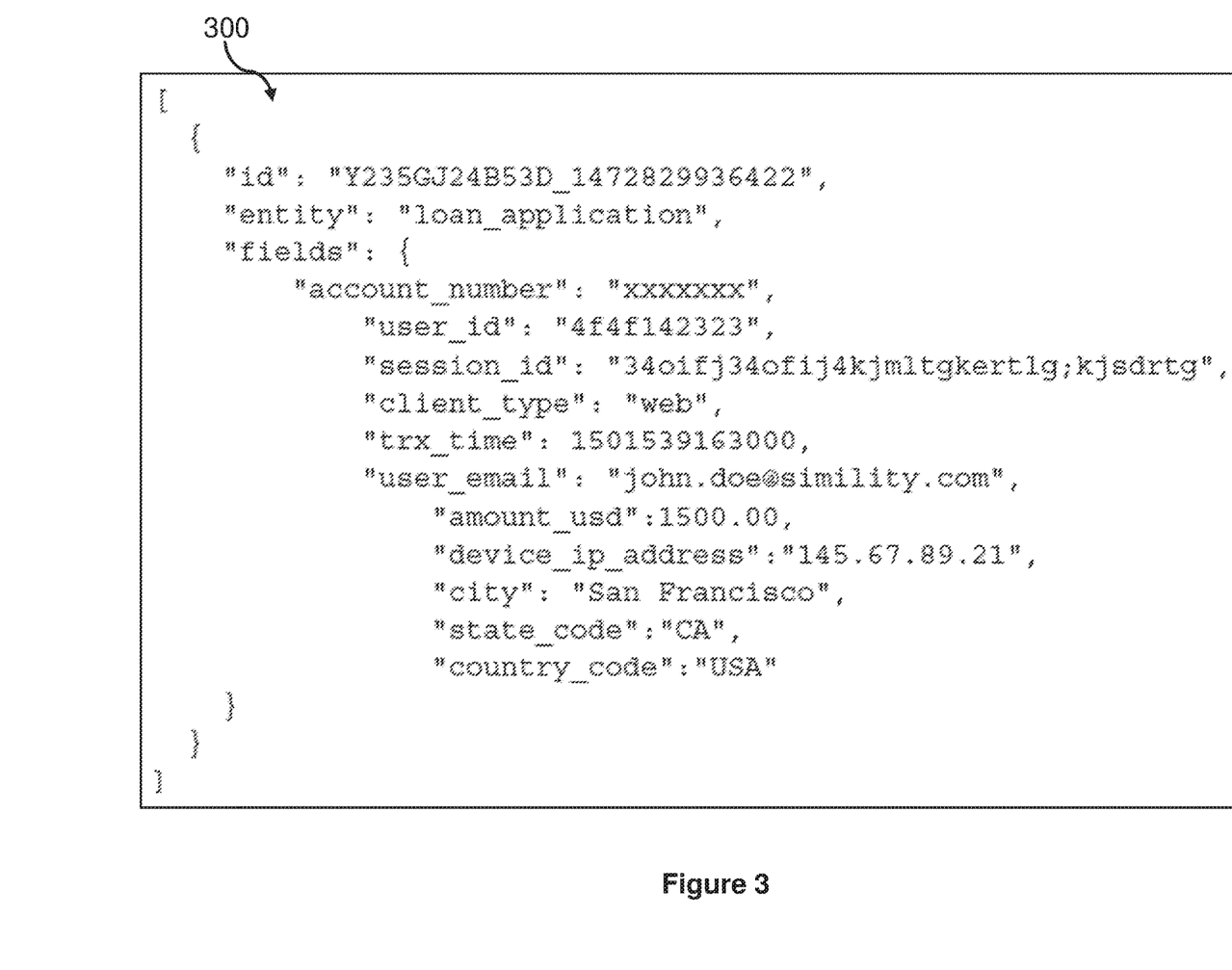

For instance, FIG. 3 shows an example segment 300 of data artifact 108a published by a data provider 120. Data artifact 300 may show various data variables for a load application record, such as the account_number, user_id, session_id, client_type, user_email, amount, device_ip_address, city, state_code, country_code, and/or the like. Here, at least the data variable device_ip_address can be indicative of a range of the geographic location of the originator of a transaction, but does not provide enough information to accurately identify the origin of the transaction by itself. However, the data variable device_ip_address, if augmented by other data, such as a device identifier, Global Positioning System (GPS) information of the device if available, a mobile service area code, and/or the like, may be used to provide a more accurate description of the originator of the transaction. Therefore, the data connector 138 may augment the data variable device_ip_address provided by one data provider with other data provided with another data provider.

Figure 4:
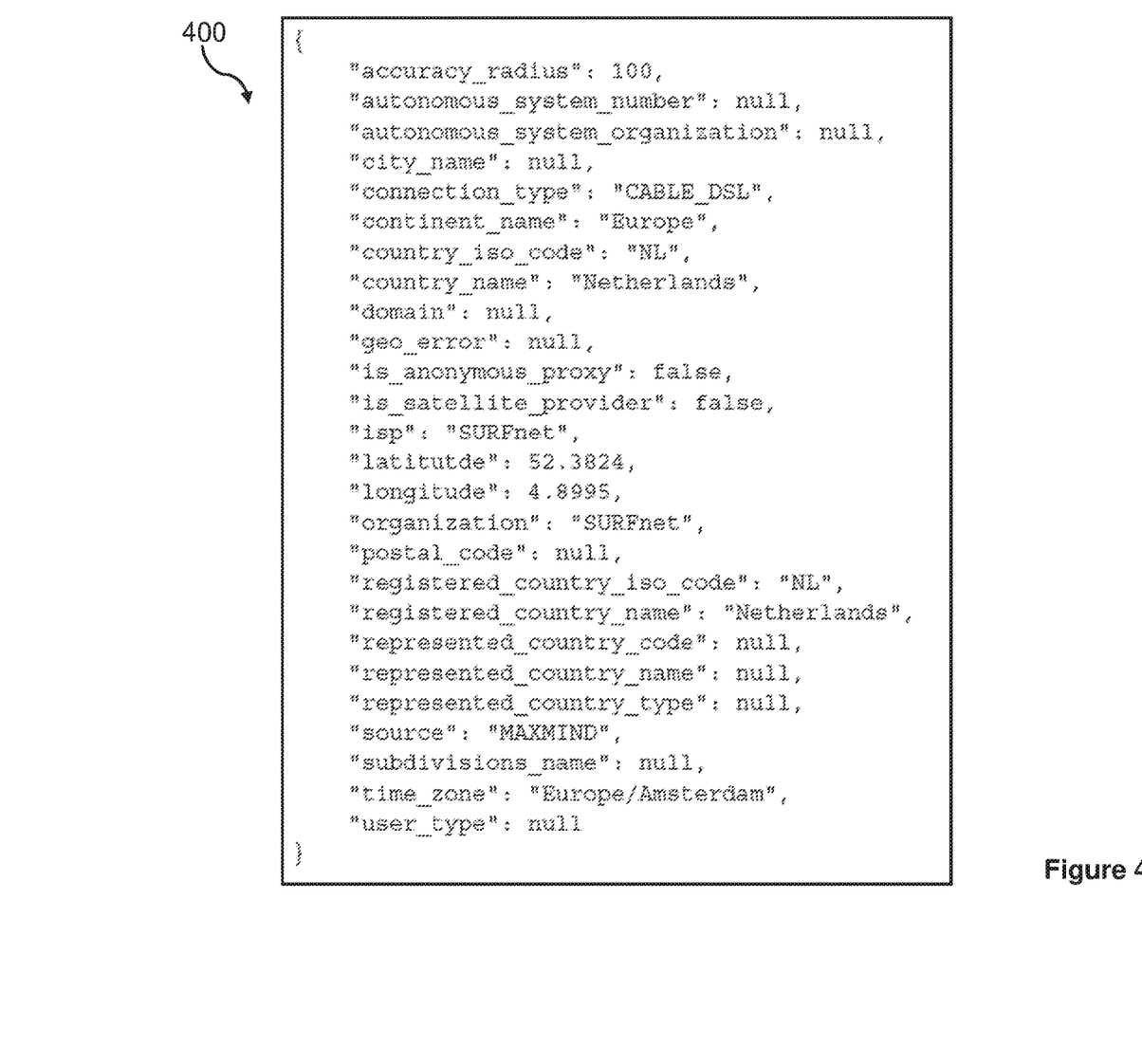
FIG. 4 is a flow diagram of an exemplary process for a user device to register for and receive a data access alert upon registration, according to an embodiment.

For example, FIG. 4 shows another example segment of data artifact 400, which may be used to augment the data artifact 300 in FIG. 3. Data artifact 400 may be provided by a data provider that provides data attributes relating to the geo-location of a user, including data variables such as but not limited to city_name, connection_type, constry_iso_code, domain, proxy, satellite_provider, postal_code, GPS coordinates, time-zone, and/or the like. Such data may augment the data variable device_ip_address to provide a more accurate depiction of the location of an origin of a transaction. In this case, data connector 138 may combine data attributes from the data artifacts 300 and 400 from different data providers and provide the combined or augmented data attributes as a bundle for identifying the originator of a transaction to the server 130.

Figure 5:
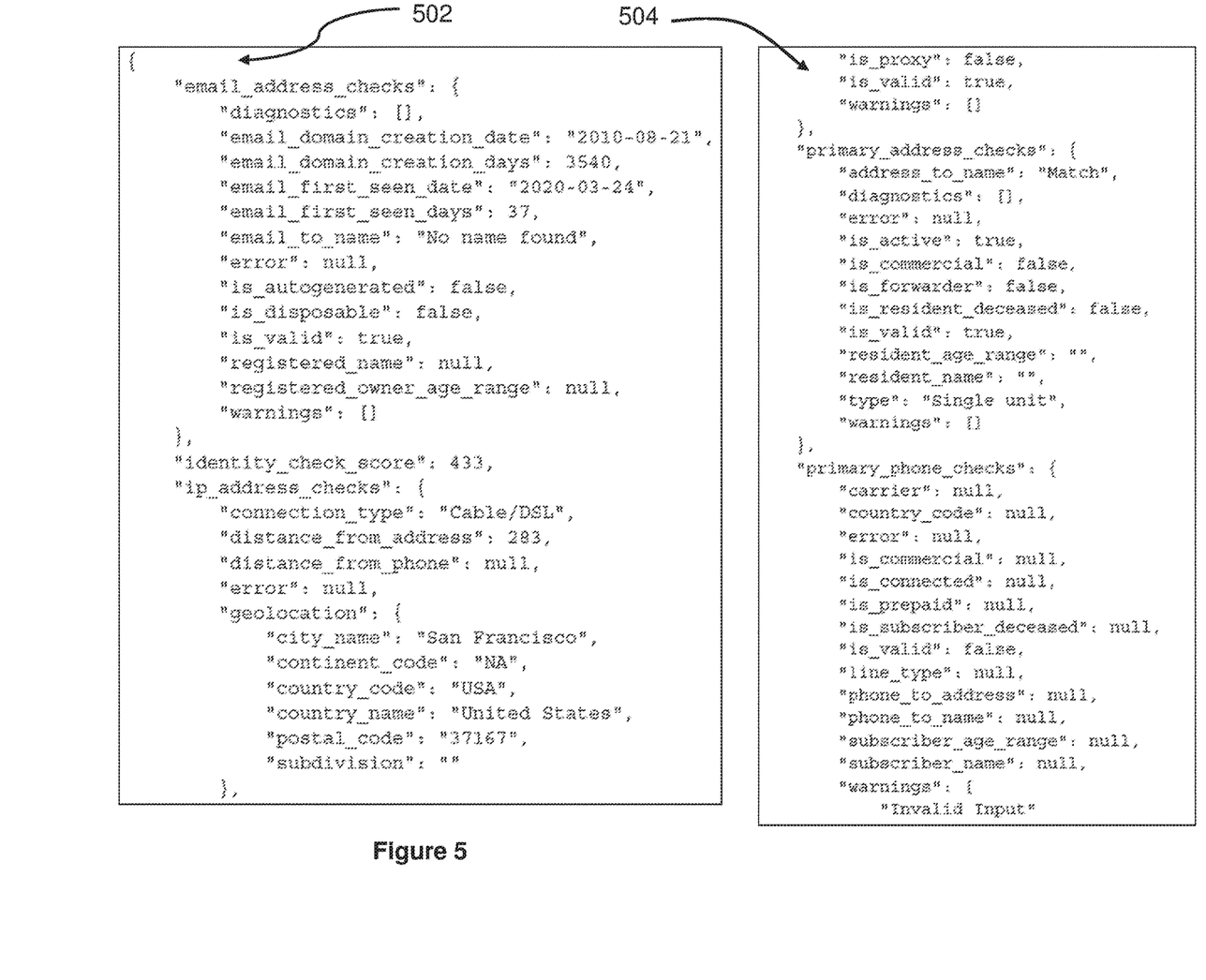
FIG. 5 is a flow diagram of an exemplary process for a service provider to generate and send a data access alert in response to a data access request to user data, according to an embodiment.

In another example, the data artifact 300 also provides data attributes such as user_email, city, state_code, country_code, etc., from a loan application, which can be further enriched by data artifacts from other data providers. For example, FIG. 5 shows another example segment of data artifact 500 from data provider WHITEPAGES®, which may be used to augment the data artifact 300 in FIG. 3. For instance, data artifact 500 provides data attributes relating to "email address check," "identity check score," "primary address checks," "primary phone checks," and/or the like, which verify the authenticity of various data attributes associated with a user. Such data attributes from data provider WHITEPAGES® may be used to augment the email, address and phone information provided in the data artifact 300 to provide verified user data for the fraud detection AI engine 140.

With reference to FIG. 1, the server 130 may intake data from the data provider 120 through the data connector 138, which integrates and enriches data artifacts 108a as described above in relation to FIGS. 3-5, and input the enriched data to the fraud detection AI engine 140. For example, the fraud detection AI engine 140 may use the enriched data for training a neural model, or may use the data as an input context for fraud detection. The server 130 may then generate an output batch file 141 indicating the fraud detection results in response to fraud detection requests relating to account creation, transactions, and/or the like.

When the burden for building a connector 138 for each data provider 120 falls on the server 130 alone, the engineering resource can hardly be efficiently allocated and system performance can be compromised due to the delay caused by the time-consuming projects for development and maintenance of the data connector 138 at a centralized location, e.g., at server 130. Instead of letting the server 130 to build all data connectors 138 for every data provider, a customer, e.g., an institutional user, operating the client device 110, may build their own data connector to intake data from their desired data provider(s). To achieve this, the server 130 may provide a development package file, e.g., in the form of a JAR file and a configuration file 107, such that the client device 110 may download and install to develop their own data connector 115. For example, the JAR file 107 may include software development kits such as Java classes for searching through data artifacts from a specific data provider based on the data format and combining or augmenting related data artifacts. In this way, the client device 110 may build their own data connector 115 for the specific data provider.

Specifically, the JAR file 107 may be stored by the server 130 at a designated location, e.g., when the server 130 sets up the fraud detection AI engine 140. The JAR file 107 may be copied by the client device 110 from the designated location to a local storage at the client device 110 on demand, or during periodic maintenance setups of the fraud detection AI engine 140. In one implementation, the JAR file 107 may be copied at a virtual machine where an exchange web service of the server 130 is deployed such that the client device 110 may further download from the web service of the server 130 and generate the data connector 115 in the form of a plugin to the web service, as further described in relation to FIG. 7.

Upon building the data connector 115 at the client device 110, the client device may be able to receive data 108b from the data provider 120, e.g., in a similar format and manner as data 108a that is previously provided to the server 130. For instance, data 108b may take a similar form as any of the data artifacts 300, 400 or 500 shown in FIGS. 3-5. The data connector 115 may organize and augment the data artifacts 300, 400 or 500 in a way similar as data connector 138 does as described above and provide the integrated data 109 to the server 130.

For example, in one implementation, the data connector 115 built at each client device 110 may each serve as a data entry point into the data pipeline for the fraud detection AI engine 140. Thus, the fraud detection AI engine 140 may use an API call, such as a representational state transfer (REST) based API, to get the integrated data 109 from the data entry point, e.g., the data connector 115.

In this way, the client device 110 is able to achieve faster development of the data connector 115 and thus faster data integration when needed. For example, the time required to develop a custom third-party integrator at the client device 110 according to the business need can be as fast as a single day, instead of waiting for scheduled data connector release or maintenance at the server 130. The on-demand development of new data connectors at the client device 110 may serve urgent needs for fraud prevention.

In addition, even in a live project, the API versions from data providers may change many times over, or the customers may request changes in input or output of a third-party data feed. This may result in modifications to the third-party integrations which may not be compatible for different customers as a generic approach. By allowing each customer to build their own data connector 115 at the client device 110, the customized data connector 115 obviates the risk of system incompatibility with the client device 110. Also, the customer may have complete end-to-end control on what and how the customer wants to enrich their data from an external feed, e.g., from data provider 120.

Further, as each customer builds their own data connector 115, different customers may no longer have to share the same data connector 138 at the server side 130, which thus reduces the risk of data exposure or leakage to unwanted parties. Data privacy and security can thus be largely improved in the data enrichment process.

Figure 2:
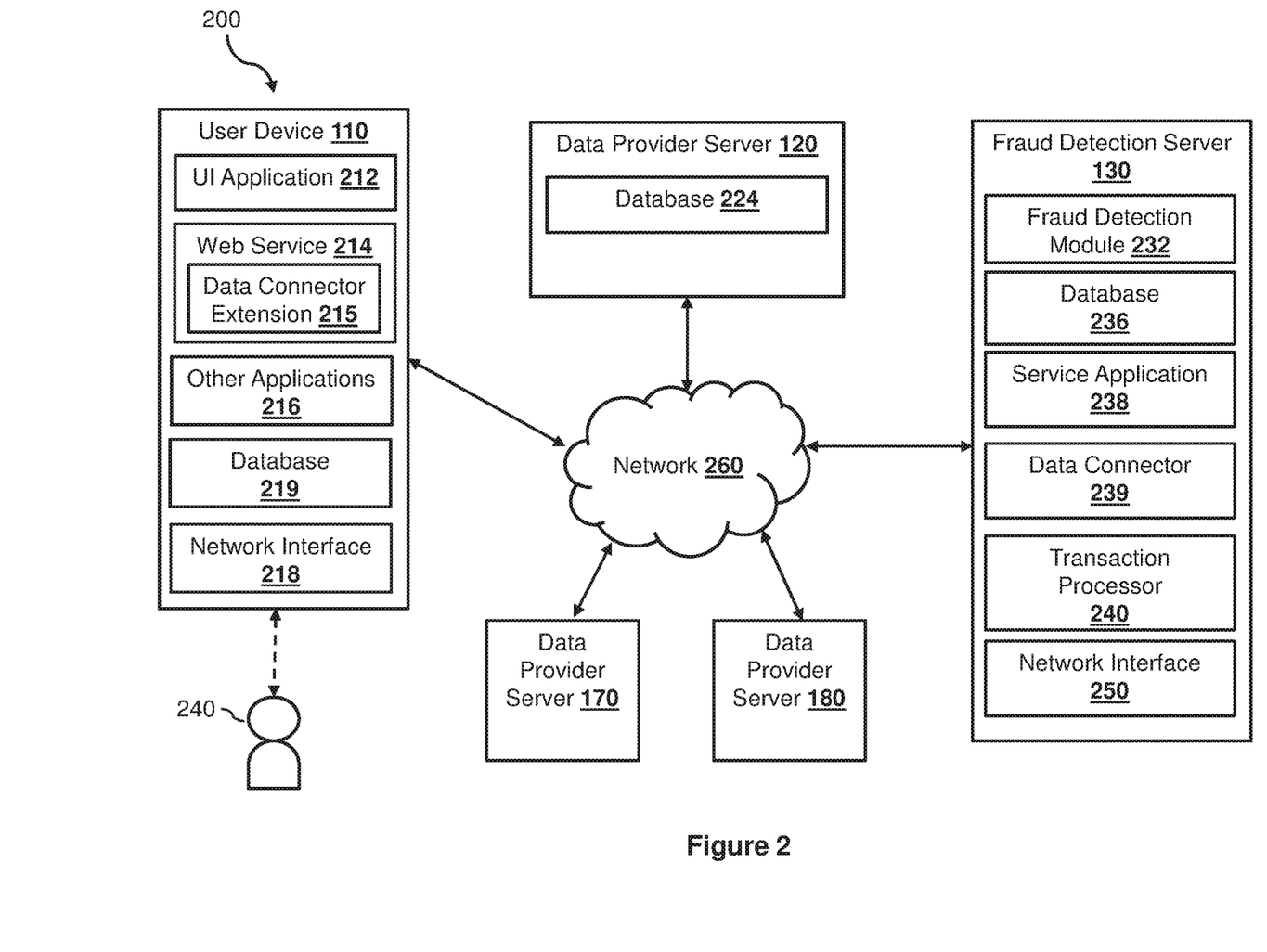
FIG. 2 is a block diagram of a networked system suitable for implementing the framework described in FIG. 1 and other embodiments described herein, according to an embodiment.

FIG. 2 is a block diagram 200 of a networked system suitable for implementing the framework described in FIG. 1 and other embodiments described herein, according to an embodiment.

In one embodiment, block diagram 200 shows a system including the user device 210 (which may be similar to client device 110 in FIG. 1), data provider servers 220 (which may be associated with data provider 120 in FIG. 1), 270 and 280, fraud detection server 230 (which may be similar to the data access notification server 130 in FIG. 1), and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data provider servers 220, 270 and 280, and the fraud detection server 230 may communicate with each other over a network 260. User device 210 may be utilized by a user 240 to access the various features available for user device 210, which may include processes and/or applications associated with data provider servers 220 to publish data artifacts to the fraud detection server 230 or the user device 210.

User device 210, data provider server 220, and fraud detection server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with service provider server 220 and/or data access notification server 230. For example, in one embodiment, user device 210 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface application 212, a web service application 214 including a data connector extension 215, and other applications 216, which may correspond to executable processes, procedures, and/or applications with associated hardware. In other embodiments, user device 210 may include additional or different modules having specialized hardware and/or software as required.

The UI application 212 may receive and/or display data to a user 240 operating the user device 210. For example, the user 240 may operate via the UI application 212 to submit a request to build a data connector extension 115 within the web service application 214, as further described in relation to FIG. 7.

The web service application 214 may correspond to one or more processes to execute modules and associated devices of user device 210 to interact with a data provider 220, the fraud detection server 230, or other online entity. For example, the web service application 214 may provide fraud detection service from the fraud detection server 230, via the network 260. In this regard, the web service application may correspond to specialized hardware and/or software utilized by user device 210 to upload a fraud detection request and relevant data, to receive an output file and/or the like on user device 210.

In some implementations, the data connector extension 215 may correspond to a data connector 115 built at the client device 110. For example, the data connector extension 215 may be built from JAR file that is stored at a designated location and copied by the user device 210 to build a plugin to the web service application 214.

The web service application 214 may be used to perform actions and/or interactions with data provider server 220, including browsing data and navigating between data, as well as processing electronic transactions and performing other data processing operations. The web service application 214 may correspond to a general browser application configured to retrieve, present, and communicate information over the Internet (e.g., utilize resources on the World Wide Web) or a private network. For example, the web service application 214 may provide a web browser, which may send and receive information over network 260, including retrieving website information, presenting the website information to the user, and/or communicating information to the website. However, in other embodiments, the web service application 214 may include a dedicated application of the fraud detection server 230 or other entity (e.g., payment provider, etc.), which may be configured to provide services through the application.

In various embodiments, user device 210 includes other applications 216 as may be desired in particular embodiments to provide features to user device 210. For example, other applications 216 may include security applications for implementing client-side security features, programmatic client applications for interfacing with appropriate APIs over network 260, or other types of applications. Other applications 216 may also include communication applications, such as email, texting, voice, social networking, and IM applications that allow a user to send and receive emails, calls, texts, and other notifications through network 260. Other applications 216 may also include other media viewing applications to consume media content on user device 210. Other applications 216 may further include a tracking application to monitor data usage on the user device 210. Other applications 216 may include device interfaces and other display modules that may receive input and/or output information. For example, other applications 216 may contain software programs, executable by a processor, including a graphical user interface (GUI) configured to provide an interface to the user.

User device 210 may further include database 219 stored in a transitory and/or non-transitory memory of user device 210, which may store various applications and data and be utilized during execution of various modules of user device 210. Database 219 may store data tracking processes and operations, such as cookies or code snippets, which may be stored in database 219 with tracked user and/or device data. Database 219 may further store data artifacts received from the data provider server 220, and/or integrated data from the data artifacts, which are enriched by the data connector extension 215. In some embodiments, database 219 may be local to user device 210. However, in other embodiments, database 219 may be external to user device 219 and accessible by user device 210, including cloud storage systems and/or databases that are accessible over network 260.

User device 210 includes at least one network interface component 218 adapted to communicate with data provider server 220 and/or fraud detection server 230. In various embodiments, network interface component 218 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data provider server 220 may correspond to a server of a data publisher that publishes data artifacts, such as those shown in FIGS. 3-5, on a regular basis. The data provider server 220 may host a database 224 for storing various data artifacts. In some embodiments, database 224 may be local to the data provider server 220. However, in other embodiments, database 224 may be external to the data provider server 220 and accessible by data provider server 220, including cloud storage systems and/or databases that are accessible over network 260. Similar to the data provider server 220, multiple data provider servers such as 270 and 280 may interact with the user device 210 through network 260.

The fraud detection server 230 of FIG. 2 contains a fraud detection module 232, a database 236, service application 238, and a data connector 239, and/or the like. The fraud detection module 232 and/or the service application 238 may correspond to one or more processes to execute software modules and associated specialized hardware to provide services to users, for example, to handle fraud detection requests from the user device 210. The fraud detection module 232 may include one or more neural networks running a fraud detection algorithm based on enriched data from data provider servers 220 and/or the user device 210.

The fraud detection server 230 may include a database 236 used to store user information, training data for the fraud detection module, and/or other integrated data. For example, the database 236 may store various enriched data artifacts, which may be combined, enriched and/or augmented data artifacts from data provider server 220. In some implementations, the stored data at the database 236 may include enriched data artifacts from different data providers but are correlated to provide a more accurate depiction of an aspect of a user, a transaction event and/or the like.

The fraud detection server 230 may further host a data connector 239, which may be similar to the data connector 138 in FIG. 1. For example, the data connector 239 may include a REST based API that communicate with an internal API at the fraud detection server 130 to supply enriched data to the data pipeline of the fraud detection module 232.

The fraud detection server 230 may be housed with, or separately with a transaction processor 240, which may be maintained, for example, by an online service provider, which may provide online transaction processing services for payment on user device 210, as well as manage payment accounts used to send and receive payments. In this regard, the fraud detection server 230 includes one or more processing applications which may be configured to interact with user device 210 and/or data provider 220 to facilitate transaction processing for purchase of data tracking capabilities on client device 210. In one example, the fraud detection server 230 may be hosted by or partnered with a transaction processor that may be provided by PAYPAL®, Inc. of San Jose, CA, USA. However, in other embodiments, the fraud detection server 230 may be maintained by or include another type of service provider, which may provide payment services to a plurality of users.

The data access notification server 230 includes at least one network interface component 250 adapted to communicate with client device 210 and/or data provider 220, 270 or 280 over network 260. In various embodiments, network interface component 250 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

FIGS. 3-5 provides example data artifacts provided by different data providers, e.g., 220, 270 and 280 in FIG. 2. The data artifacts may be enriched by the data connector, e.g., by correlating and combining related data attributes, as discussed in relation to FIG. 1.

Figure 6:
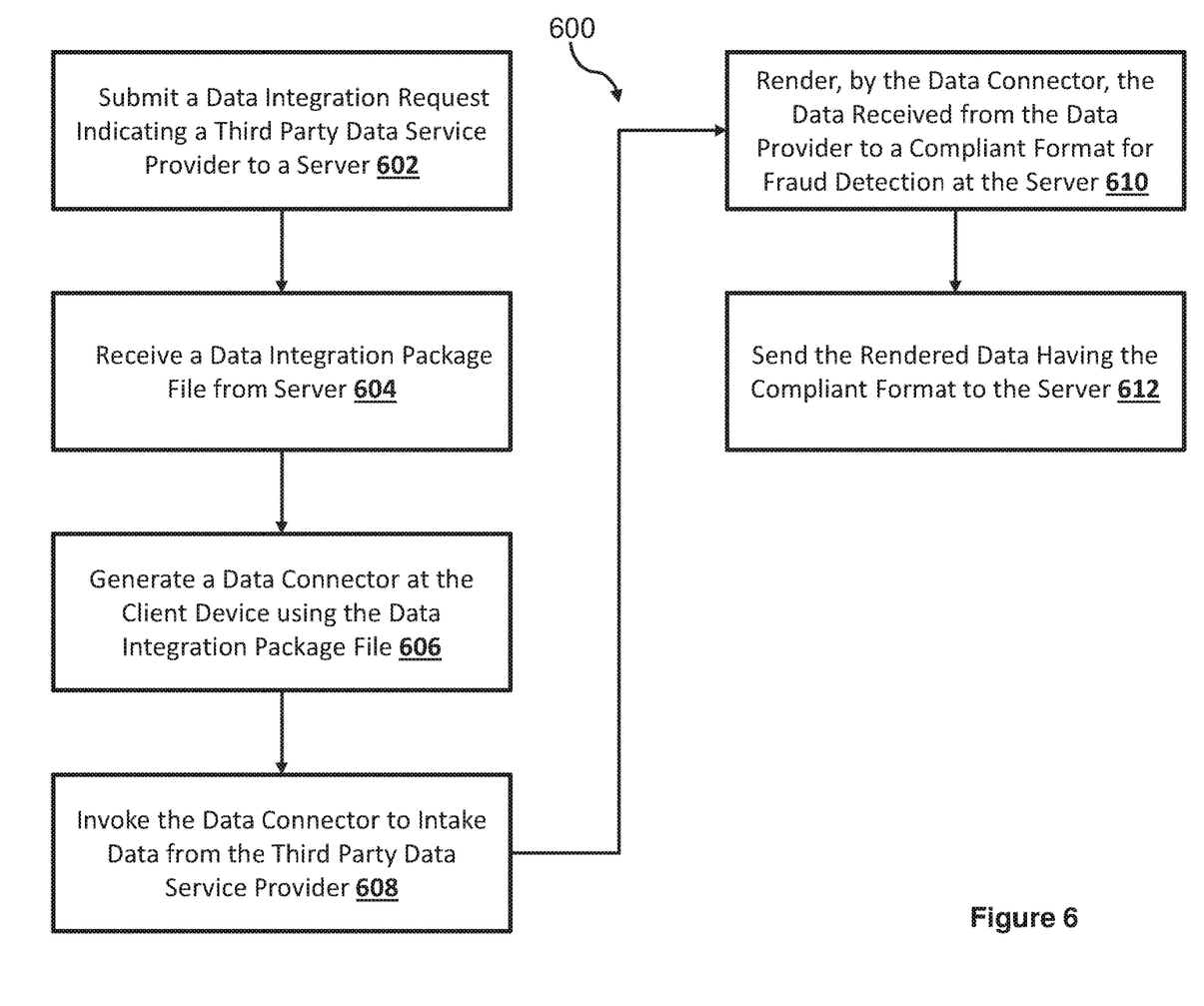
FIG. 6 is a flow diagram of an exemplary process for a user device to build a data connector using a development package file provided by a server, according to an embodiment.

FIG. 6 is a flow diagram of an exemplary process for a user device (such as 110 in FIG. 1 or 210 in FIG. 2) to build a data connector using a development package file provided by a server, according to an embodiment. One or more of the processes of process 600 may be implemented, at least in part, in the form of executable code stored on non-transitory, tangible, machine-readable media that when run by one or more processors may cause the one or more processors to perform one or more of the processes. In some embodiments, process 600 may be performed by the user 110 in FIG. 1 or the user device 210 in FIG. 2. It is worth noting that additional processes, steps and/or implementations may be omitted, performed in a different sequence, or combined as desired or appropriate.

Process 600 begins with step 602 where the user device may submit a data integration request indicating a third-party data service provider to a server. For example, as shown in FIG. 2, a user 240, such as a bank, may access the fraud service application 238 at the fraud detection server 230 via the web service application 224, to request fraud detection based on data submitted from a particular data provider 220, such as the Brazilian Census Bureau, the Credit Reference Center of China, and/or the like.

At step 604, the user device may receive a data integration package file from the server. For example, as shown in FIG. 1, the fraud detection server 130 may deliver an SDK in the form of a JAR file and/or a configuration file to the client device 110 to build a data connector at the client device side. In some implementations, the JAR file may be stored at a designated location, e.g., in the cloud storage server of the fraud detection server, and the client device 110 may copy the JAR file locally as an SDK to develop its own data connector.

At step 606, the user device may generate a data connector at the client device using the data integration package file. In some implementation, a user, e.g., user 240 in FIG. 2, may use the JAR file as an SDK and guideline provided together with the JAR file to build a data connector. In another implementation, the user device may copy the JAR file to a virtual machine on which the web service application 214 is instantiated and thus create a data connector extension 215 to the web service application 214.

At step 608, the user device may invoke the data connector to intake data from a third-party data provider. For example, the user device may build the data connector customized for the Brazilian Census Bureau, the Credit Reference Center of China, and/or the like, which may parse and identify data attributes specific to such data providers.

At step 610, the user device may, by the data connector, render the data received from the data provider to a compliant format for fraud detection at the server. Specifically, data attributes obtained by the data connector may be enriched by other data attributes from other data providers to augment the information carried by the data attributes. For example, the name, address information, and registration information of a Chinese holding company obtained from the Credit Reference Center of China may be augmented by credit rating information of the same company from a U.S. credit bureau. For another example, scanned images of census records from the Brazilian Census Bureau may be processed to translate into data fields such as name, date of birth, residential address, postal code, and/or the like.

At step 612, the rendered data having the complaint format may be sent to the fraud detection server. For example, the augmented data relating to the Chinese holding company and/or information relating to a Brazilian citizen may facilitate fraud detection for an international transaction involving such entities.

Figure 7:
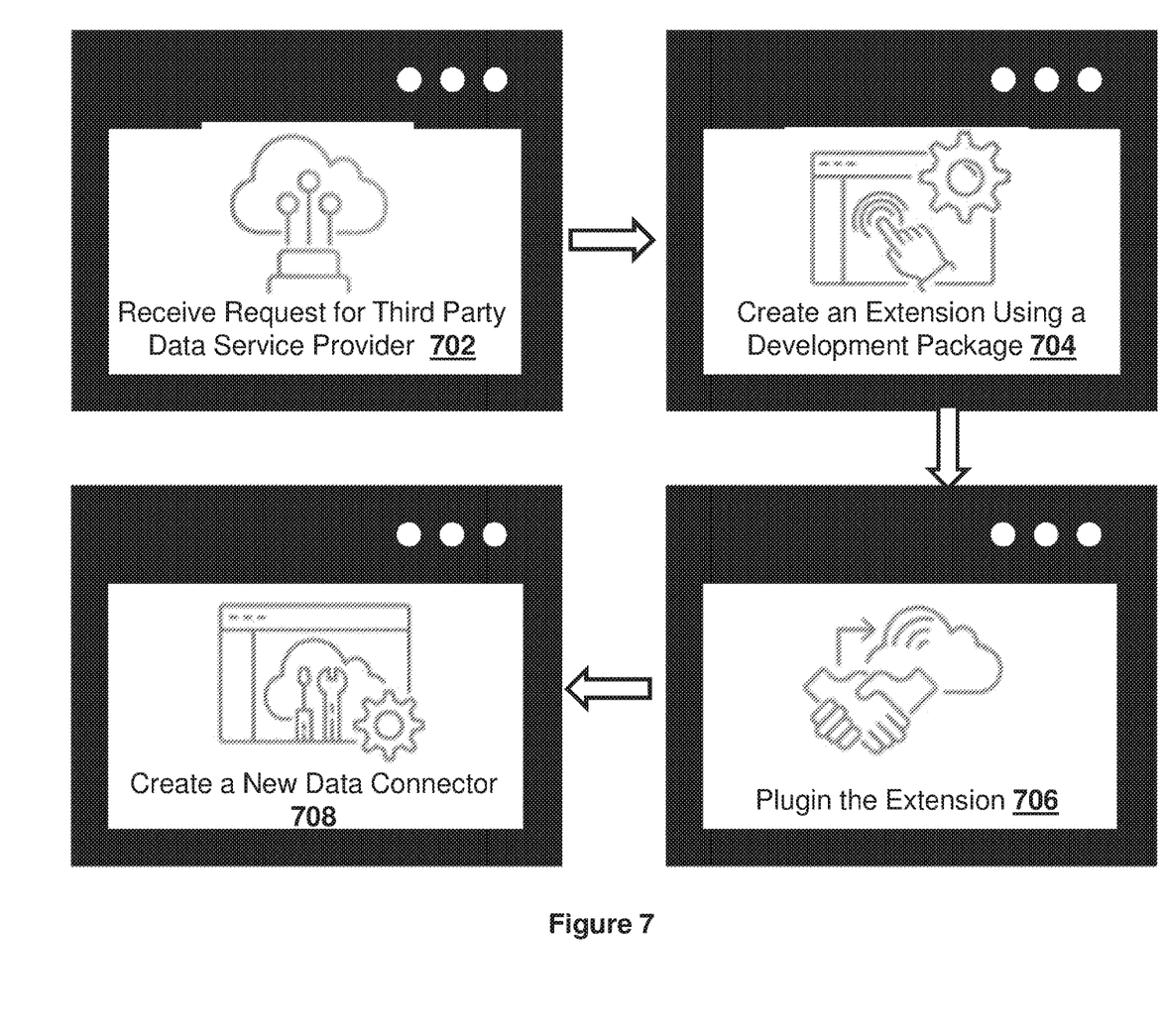
FIG. 7 provides an example diagram flow illustrating using the web service application to create a data connector extension shown in FIG. 2, according to one embodiment.

FIG. 7 provides an example mock UI diagram flow illustrating using the web service application 214 to create a data connector extension 215 shown in FIG. 2, according to one embodiment.

At block 502, a user may choose a third-party data service provider via a user interface of a web service application, e.g., similar to step 602 in FIG. 6. At block 504, the user may create an extension using a configuration guide. For example, the web service application may provide one or more web pages of step-by-step instruction for the user to follow through a series of steps. At block 506, the user may plugin the created extension, e.g., by establishing a connection between the extension 215 with the service application 238 at the fraud detection server 230 via the web service application 214. In this way, the created extension 215 serves as a data entry point for the fraud detection server 230 to intake data into the data pipeline for the fraud detection module 232. At block 508, the new data connector 508 is created, and the user may choose the data service provider, via the web service application 214, to intake data via the created extension 215.

Figure 8:
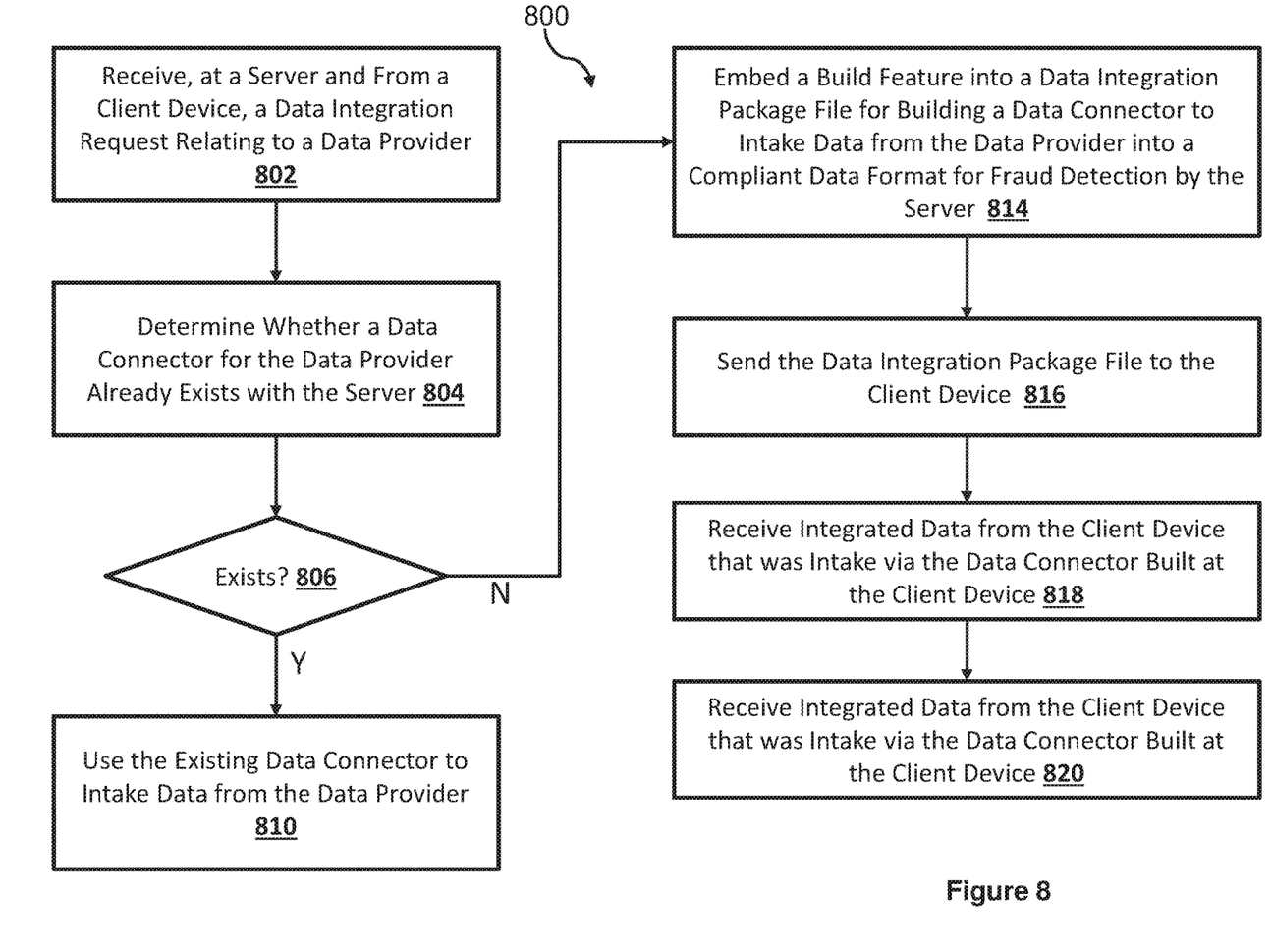
FIG. 8 is a flow diagram of an exemplary process for a server to deliver a development package file to a client device for building a data connector at the client side, according to an embodiment.

FIG. 8 is a flow diagram of an exemplary process for a server (such as 130 in FIG. 1 or 230 in FIG. 2) to deliver a development package file to a client device for building a data connector at the client side, according to an embodiment. One or more of the processes of process 800 may be implemented, at least in part, in the form of executable code stored on non-transitory, tangible, machine-readable media that when run by one or more processors may cause the one or more processors to perform one or more of the processes. In some embodiments, process 800 may be performed by the fraud detection server 130 in FIG. 1 or 230 in FIG. 2. It is worth noting that additional processes, steps and/or implementations may be omitted, performed in a different sequence, or combined as desired or appropriate.

At step 802, the server may receive from a client device, a data integration request relating to a data provider. For example, step 802 may occur subsequent to step 602 in FIG. 6. Also, as shown at block 502 in FIG. 7, the server may receive an indication of a new data provider via the service application 238, which receives the user input of the new data provider from the web service application 114 of the client device 210.

At step 804, the server may determine whether a data connector for the data provider already exists with the server. For example, if the user desires to add a data connector for a U.S. bank, a U.S. credit rating bureau, and/or the like, the fraud detection server hosted at PAYPAL® is likely to have previously built a data connector at the server side to intake data from these data providers, as these data providers may be frequently used in fraud detection with a number of financial institution customers. For another example, if the user desires to add a data connector for the Brazilian credit bureau, etc., which is less likely to be frequently used by the fraud detection server, the server may not have a data connector ready to use.

At step 806, when the data connector for the requested data provider already exists, process 800 proceeds to step 810, at which the server uses the previously built data connector for the particular data provide to intake data from the data provider. Alternatively, process 800 proceeds to step 814, where the server embed a building feature into a data integration package file for building a data connector to intake data from the particular data provider. For example, as shown in FIG. 1, the JAR file and/or a configuration file may be configured with a SDK and guidelines for a user to build a data connector using the SDK under the guidelines, whenever the data connector is in demand.

In some implementations, the server may embed a building feature into the data integration package based on any of: the type of the data provider (e.g., different types of the data provider may have different data formats, etc.), the type of the entity associated with the client device (e.g., whether an individual user or an institutional user, etc.), a type of the platform associated with the client device (e.g., the type of the operating system, the browser application, the web service application, etc.); and a type of the transaction to be cleared, and/or the like.

In some implementations, in addition to determining that the server does not have a pre-existing data connector for the requested particular data provider, the server may determine how many times or how often, e.g., the number of occurrences or the frequency when the client device requests data integration from data providers having no existing data integration interfaces with the server. For example, if the client device frequently demand data integration from new data providers, e.g., the number of occurrences or the frequency when the client device requests data integration from new data providers is greater than a threshold, the server may provide the data integration package file to the client device for building its own data connector.

At step 816, the server may send the data integration package file to the client device. In some implementation, the server may store the data integration package file, e.g., a JAR file, at a designated location, such that a client device may access the designate location to download the JAR file via the web service application 214. For example, step 816 may occur in conjunction with, or concurrently with step 604 in FIG. 6.

At step 818, the server may then receive integrated and/or enriched data from the client device that was intake via the data connector built at the client device. In some implementation, the data connector at the client side may be connected to the server as a data entry point into the data pipeline at the server. In one implementation, step 818 may occur subsequent to step 612 in FIG. 6, when the client device sends the rendered and/or enriched data to the server.

Figure 9:
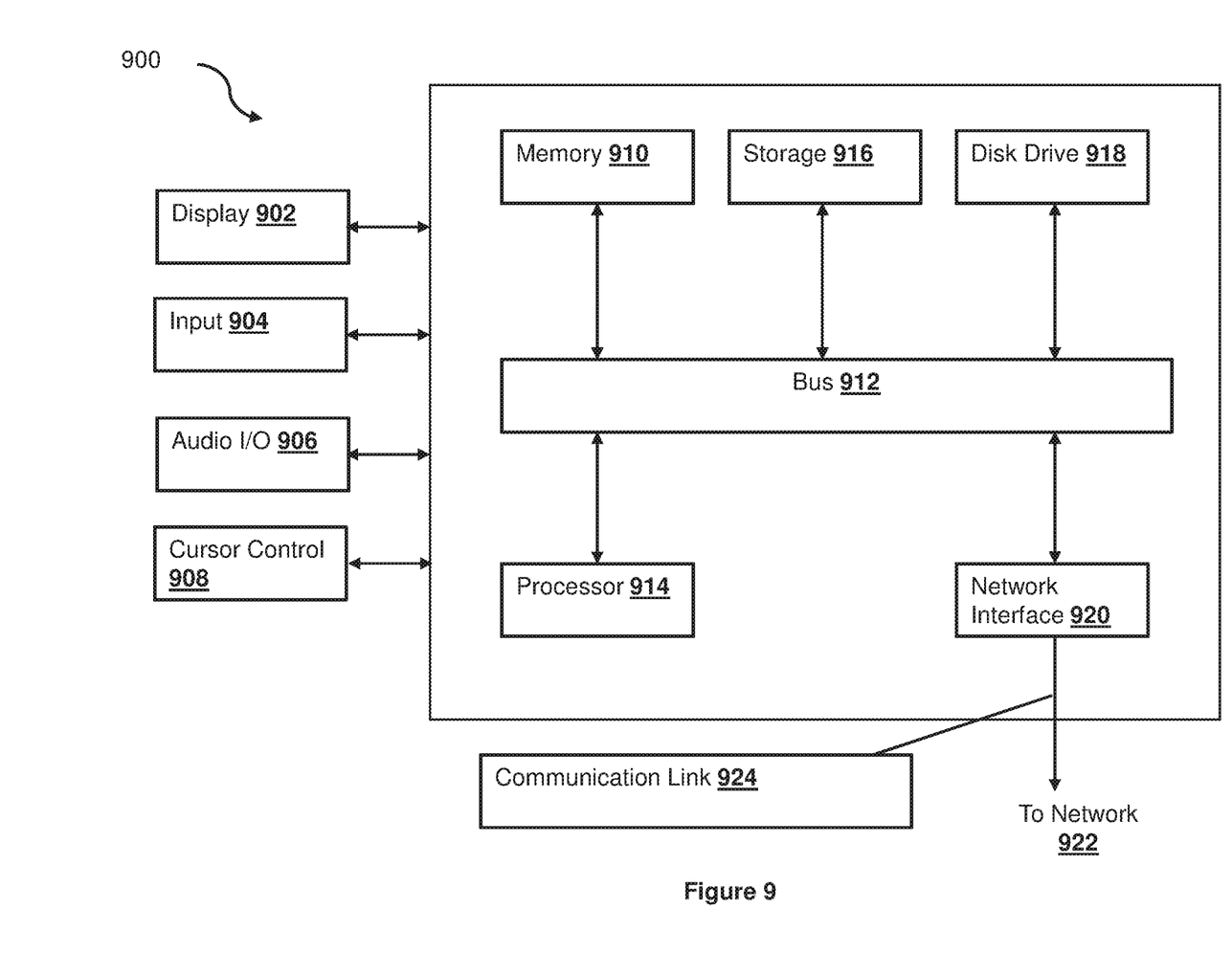
FIG. 9 is a block diagram of a computer system suitable for implementing one or more components shown in FIGS. 1-5 and performing one or more processes shown in FIGS. 6-8, according to an embodiment.

FIG. 9 is a block diagram of a computer system suitable for implementing one or more components shown in FIGS. 1-5 and performing one or more processes shown in FIGS. 6-8, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the position detection of webpage elements described herein according to the process 300.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
    receiving, at a server and from a client device, a data integration request relating to a data provider;
    generating, by the server, a data integration package file that is embedded with a building feature for building a data connector at the client device, wherein the data connector is configured to intake data from the data provider into a compliant data format for fraud detection;
    sending, via a communication interface at the server, from the server to the client device, the data integration package file to be instantiated at the client device thereby causing the data connector to be built and to convert data from the data provider into the compliant data format at the client device;
    obtaining, at the server and from the client device, the converted data having the compliant data format; and
    generating, by a neural network implemented at the server, an output indicating fraud information in response to input transaction data.

2. The method of claim 1, wherein the data integration package file includes a plurality of JAR developer files and a configuration file configured with a software development kit (SDK) for a user to build the data connector using the SDK.

3. The method of claim 1, wherein generating the data integration package file comprises:
    embedding the building feature based on a type of the data provider and/or a type of an entity associated with the client device.

4. The method of claim 1, wherein generating the data integration package file comprises:
    embedding the building feature into the data integration package file in response to a particular type of operation system and/or application running on the client device that sends the data integration request.

5. The method of claim 1, further comprising:
    upon creating the data integration package file, storing the data integration package file at a designated location at the server.

6. The method of claim 1, further comprising:
    determining whether the data provider has an existing data connector with the server;
    in response to determining that the data provider has no existing data connector with the server, determining a number of occurrences or a frequency when the client device requests data integration from data providers having no existing data connector with the server; and in response to determining that the number of occurrences or the frequency when the client device requests data integration from data providers having no existing data connector with the server exceeds a threshold, generating the data integration package file for sending to the client device.

7. The method of claim 1, further comprising:

training the neural network implemented at the server using the converted data having the compliant data format for fraud detection.

8. The method of claim 1, further comprising:

receiving, at the server and from the client device, a fraud detection request relating to a transaction; and using the data having the compliant data format as an input to a fraud detection system at the server without directly intaking the data from the data provider.

9. The method of claim 1, wherein the data connector is built at the client device by copying the data integration package file to a virtual machine where an exchange web service of the server is deployed.

10. A non-transitory processor-readable storage medium storing processor-executable instructions at a server, wherein the processor-executable instructions comprising:

a first processor-executable instruction embedded with a building feature for building a data connector, wherein the data connector is configured to intake data from a data provider into a compliant data format for fraud detection;

a second processor-executable instruction that is executable by a processor of the server to deliver the first processor-executable instruction in a form of a data integration package file to a client device from the server, wherein the first processor-executable instruction is executable by a processor of the client device to perform operations comprising:

generating the data connector at the client device based on the data integration package file;

in response to a data integration request for intaking data from a data provider, invoking the data connector to intake the data from the data provider;

rendering, by the data connector, the data received from the data provider to a compliant format for fraud detection at the server; and sending the rendered data having the compliant format to the server.

11. The non-transitory processor-readable storage medium of claim 10, wherein the processor-executable instructions comprise a third processor-executable instruction that is executable by the processor of the server to generate the data integration package file, including:

embedding the building feature based on a type of the data provider and/or a type of an entity associated with the client device.

12. The non-transitory processor-readable storage medium of claim 11, wherein the building feature is embedded into the data integration package file further based on a particular type of operation system and/or application running on the client device that sends the data integration request.

13. The non-transitory processor-readable storage medium of claim 10, wherein the operations further comprise:

building the data connector at the client device by copying the data integration package file to a virtual machine where an exchange web service of the server is deployed.

14. The non-transitory processor-readable storage medium of claim 10, wherein the data integration package file includes a plurality of JAR developer files and a configuration file configured with a software development kit (SDK) for a user to build the data connector using the SDK.

15. A system comprising:

a memory configured to store a data integration package file at a designated location;

a processor configured to:

generate the data integration package file that is embedded with a building feature for building a data connector at a client device, wherein the data connector is configured to intake data from a data provider into a compliant data format for fraud detection;

send, from a server to the client device, the data integration package file to be instantiated at the client device, wherein the integration package file causes the data connector to be built and to convert data from the data provider into the compliant data format at the client device;

obtain, from the client device, the converted data having the compliant data format; and generate, by a neural network implemented at one or more hardware processors, an output detecting possible fraud in response to input transaction data.

16. The system of claim 15, wherein the data integration package file includes a plurality of JAR developer files and a configuration file configured with a software development kit (SDK) for a user to build the data connector using the SDK.

17. The system of claim 15, wherein the processor is further to generate the data integration package file, comprising:

embedding the building feature based on a type of the data provider and/or a type of an entity associated with the client device.

18. The system of claim 15, wherein the processor is further to generate data integration package file, comprising:

embedding the building feature into the data integration package file in response to a particular type of operation system and/or application running on the client device that sends the data integration request.

19. The system of claim 15, wherein the processor is further to:

determine whether the data provider has an existing data connector with the server;

in response to determining that the data provider has no existing data connector with the server, determine a number of occurrences or a frequency when the client device requests data integration from data providers having no existing data connector with the server; and in response to determining that the number of occurrences or the frequency when the client device requests data integration from data providers having no existing data connector with the server exceeds a threshold, generate the data integration package file for sending to the client device.

20. The system of claim 15, wherein the processor is further to:

receive, from the client device, a fraud detection request relating to a transaction; and use the data having the compliant data format as an input to a fraud detection system at the server without directly intaking the data from the data provider.

* * * * *